United States Patent [19]

Hart et al.

[11] Patent Number: 4,568,606

[45] Date of Patent: Feb. 4, 1986

[54] POWDER COATABLE EPOXY/POLYESTER COMPOSITION AND ELECTRICAL CONDUCTORS COATED THEREWITH

[75] Inventors: Stephen C. Hart, Warsaw; Steven L. Kiefer, Argos, both of Ind.

[73] Assignee: Morton Thiokol, Inc., Chicago, Ill.

[21] Appl. No.: 681,974

[22] Filed: Dec. 14, 1984

[51] Int. Cl.$^4$ ............................................. B32B 15/00
[52] U.S. Cl. ................................... 428/379; 523/454; 524/359
[58] Field of Search ........................ 525/111; 523/454; 524/359; 428/379

[56] References Cited

U.S. PATENT DOCUMENTS

| | | | |
|---|---|---|---|
| 3,027,279 | 3/1962 | Kurka et al. | 428/379 |
| 4,074,006 | 2/1978 | Boldebuck | 428/379 |
| 4,317,858 | 3/1982 | Sattler | 428/379 |
| 4,346,144 | 8/1982 | Craven | 523/454 |
| 4,414,279 | 11/1983 | Bernelin | 428/413 |
| 4,499,239 | 2/1985 | Murakami et al. | 525/111 |

FOREIGN PATENT DOCUMENTS

| | | | |
|---|---|---|---|
| 52-13526 | 2/1977 | Japan | 524/359 |
| 56-167766 | 12/1981 | Japan | 524/359 |

OTHER PUBLICATIONS

Lee, H. and Neville, K. *Handbook of Epoxy Resin*, McGraw Hill, Inc., 1967, pp. 17-28 through 17-33 and 24-33.

Lupinski, J. H. and Gorowitz, B., Power Coating of Magnet Wire, General Electric Report 79 CRD 166, Jul. 1977, Presentation at Electrical/Electronics Insulation Conference, Oct. 9-11, 1979, Boston, MA.

Gorowitz, B., Powder Coating for Magnet Wire Insulation, *Powder Coatings*, Sep. 1981, pp. 1-4.

*Primary Examiner*—Lewis T. Jacobs
*Attorney, Agent, or Firm*—Richard J. Sheridan; Gerald K. White

[57] ABSTRACT

Electrical conductors can be coated with a cured, thermosetting powder coating which, in its uncured state comprises a saturated, carboxyl group-containing polyester resin, an epoxy resin, an acrylic resin and, optionally, a cure catalyst, benzoin and/or a polyamide resin to provide insulative coatings with reduced air entrapment and improved dielectric strength.

9 Claims, No Drawings

POWDER COATABLE EPOXY/POLYESTER COMPOSITION AND ELECTRICAL CONDUCTORS COATED THEREWITH

BACKGROUND OF THE INVENTION

1. Field of the Invention

This invention relates to compositions useful as thermosetting powder coatings. These compositions are used as insulative coatings on electrical conductors such as aluminum and copper magnet wire (wire for magnetic coils).

2. Description of the Prior Art

Traditionally, magnet wire, i.e. wire employed in magnetic coils, have been electrically insulated with enamel coatings. In the conventional wire enamelling process single strands of cleaned and annealed copper or aluminum wire of round or rectangular cross section are passed, horizontally or vertically, through a trough containing circulated and continuously filtered enamel. Excess enamel is removed from the wire and the thus-coated wire is passed through an oven in which the enamel solvent is evaporated and the resin formulation is allowed to flow out, level and cure. This process may have to be repeated several times in order to produce a coating of the desired thickness without pinholes, blistering, sagging or bubble entrapment.

While the enamelling process can produce satisfactory coatings, it has several significant drawbacks. For example, the enamel contains a relatively large amount of organic solvent, which is evaporated in the curing oven. This results in pollution problems which can generally be cured only by the use of expensive solvent recovery equipment. The need to remove the solvent from the enamel coating also causes potential problems in the film properties of the coating. If the solvent is removed too rapidly, blistering or bubble entrapment can occur.

For the above reasons, it is highly desirable to employ solvent-free wire coatings. One alternative to the solvent-containing enamel coatings has been electrostatic powder coatings. However, while electrostatic powder coatings can be used to overcome many of the drawbacks of the enamelling process they have still not proven entirely satisfactory. One problem which still exists is the entrapment of air in the cured coating, resulting in a potential decrease in the dielectric strength of the coating.

SUMMARY OF THE INVENTION

In accordance with the present invention, there are provided thermosetting powder coating compositions comprising a saturated, carboxyl group containing polyester resin, an epoxy resin, an acrylic resin, and, optionally, a cure catalyst, benzoin, and/or a polyamide resin. It has been discovered that the thermosetting powder coating compositions of this invention, when used as insulative coatings on electrical conductors, especially magnet wire, provide coatings with reduced air entrapment and improved dielectric strength.

This invention further provides an electrical conductor coated with a cured thermosetting powder coating which, in its uncured state, comprises a saturated, carboxyl group-containing polyester resin, an epoxy resin, an acrylic resin, and, optionally, a cure catalyst, benzoin and/or a polyamide resin.

DETAILED DESCRIPTION OF THE PREFERRED EMBODIMENTS

The thermosetting powder coating compositions of this invention contain a saturated, carboxyl group-containing polyester resin. Typical polyesters useful in the practice of this invention have number molecular weights of about 2750 to about 3750, functionality of about 2.30 to about 3.75 and acid values of about 30 to about 80. Examples of saturated, carboxyl group-containing polyester resins which may be employed in the practice of this invention include, but are not limited to, those having the following characteristics:

| NUMBER MOLECULAR WT. | FUNCTIONALITY | ACID VALUE |
|---|---|---|
| 2750–3250 | 2.75 ± 0.25 | 48–55 |
| 2750–3250 | 3.75 ± 0.25 | 70–80 |
| 3250–3750 | 2.35 ± 0.10 | 30–36 |
| 3250–3750 | 2.30 ± 0.10 | 20–36 |

The epoxy resins useful in the thermosetting powder coatings of this invention are solid resins which are the reaction products of a diol and a halohydrin. Epoxy resins which are useful in the practice of this invention are exemplified by, but not limited to, resins produced by reacting epichlorohydrin and bisphenol A. Preferred epoxy resins include those sold by Shell Chemical Company under the designation "Epon" (such as Epon 2002 which has a molecular weight of about 1450, functionality of about 1.9 and epoxy equivalent weight of about 710), those sold by Dow Chemical U.S.A. under the designation "D.E.R." (such as D.E.R. 642U which has a molecular weight of about 1100–1300, functionally about 2.3 and epoxy equivalent weight about 478–565) and those sold by Ciba Geigy under the designation "Araldite" (such as Araldite PT 810 triglycidyl isocyanurate which has a molecular weight of about 1500–1900, functionality of about 3.0 and epoxy equivalent weight of about 101–111).

The acrylic resins which may be employed in the thermosetting powder coating compositions of this invention are generally liquids which have been converted to powder form by absorption onto silica-type materials. These acrylic resins function as melt flow control agents. Exemplary of the acrylic resins is Resiflow P acrylic resin sold by SBS Chemicals, Inc. which is a 2-propenoic acid, ethyl ester polymer.

The thermosetting powder coatings of this invention may employ a catalyst to increase the cure rate of the coating. These catalysts are quaternary ammonium salts, preferably aryltrialkylammonium salts. A particularly preferred catalyst is benzyltrimethylammonium chloride sold under the trademark Sumquat 2334 by Hexcel Corporation. These cure catalysts typically function as follows:

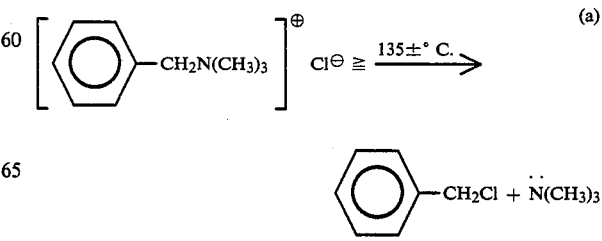

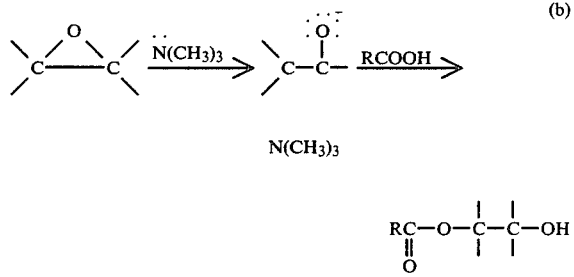

(b)

$$RC-O-C-C-OH$$

Benzoin may be used in the thermosetting powder compositions of this invention as a melt flow modifier.

In accordance with the present invention, the thermosetting powder coating compositions may also contain a polyamide resin adhesion promoter. Examples of such polyamide resins include, but are not limited to, those sold by General Mills Chemicals, Inc. under the designation "Versamid" which are the condensation products of polyamines and the dibasic acids obtained when certain unsaturated fatty acids are polymerized, e.g. the 9, 12-octadecandienoic acid (Z,Z)-, dimer, polymer with 1,2-ethanediamine. Versamid 754 polyamide is a preferred polyamide resin.

In addition to the above components, the thermosetting powder coatings of this invention may contain additional additives. For example, a coloring agent may be added to the powder coating composition should a colored coating be desired. Fumed silica may also be employed as a powder flow additive. A preferred fumed silica is sold by Cabot Corporation under the trademark CAB-O-SIL. Other possible additives include slip or antimar additives, such as dimethyl, methyl phenethyl and trimethylsilyl-terminated siloxanes and silicones, or polyethylene.

The components of the thermosetting powder coating compositions of this invention are employed in the amounts indicated in Table A below.

TABLE A

| COMPONENT | PARTS BY WEIGHT | |
|---|---|---|
| | GENERAL | PREFERRED |
| Saturated, carboxyl group-containing polyester resin | 30 to 95 | 50 to 70 |
| Epoxy resin | 5 to 60 | 20 to 40 |
| Acrylic resin | 0.5 to 5.0 | 1.0 to 2.0 |
| Cure Catalyst | 0 to 5.0 | 0.5 to 1.0 |
| Benzoin | 1.0 to 10.0 | 3.0 to 5.0 |
| Polyamide resin | 0 to 10.0 | 1.0 to 3.0 |
| Fumed silica | 0 to 1.0 | 0.1 to 0.3 |
| Coloring agent | 0 to 5.0 | 0.3 to 0.7 |

The thermosetting powder coating compositions of this invention are prepared by conventional techniques employed in the powder coating art. The components, with the exception of the powder flow additive, are blended together thoroughly. The resulting mixture is then melt mixed, for example in an extruder or on a two roll mill. The resulting product, usually in sheet form, is broken into chips, and blended with the powder flow additive in a low intensity blender. The resulting product is then ground to a powder on, for example, a hammermill and sieved to achieve the desired particle size.

The thermosetting powder coating compositions of this invention can be employed as insulative coatings for electrical conductors, especially magnet wire. The powders have an average particle size of about 10 to about 50 microns, preferable about 30 to about 40 microns. They are applied to the electrical conductor by techniques well known in the powder coating art. For example, the magnet wire (copper, aluminum or steel) is cleaned with, for example, a phosphoric acid solution. The powder coating is then deposited on the magnet wire electrostatically as the wire passes over a fluid bed containing the coating. The thus-coated wire is then passed through a high temperature (e.g. about 800° F.) oven for a period of time sufficient to fuse and cure the coating (generally about 20 seconds at 800° F.).

The following examples illustrate the present invention and are not intended to limit the invention in any manner.

EXAMPLE 1

A thermosetting powder coating composition in accordance with this invention was prepared from the components indicated in Table 1.

TABLE 1

| COMPONENT | PARTS BY WEIGHT |
|---|---|
| Saturated, carboxyl group-containing polyester resin[1] | 60.0 |
| Epoxy resin[2] | 40.0 |
| Acrylic resin[3] | 1.5 |
| Benzyltrimethylammonium chloride cure catalyst | 1.0 |
| Benzoin | 1.4 |
| Polyamide resin[4] | 1.0 |
| Colorant | 0.5 |
| Fumed silica | 0.1 |

[1]No. mol. wt. 2750–3250, functionality 2.75 ± 0.25, acid value 48–55.
[2]Epon 2002 epoxy resin.
[3]Resiflow P acrylic resin
[4]Versamid 754 polyamide The components of Table 1, with the exception of the fumed silica, were mixed together for about 15 minutes in a low intensity twinshell blender. The resulting mixture was melt mixed in a Buss PR46 extruder (300° F. zone temperature, cool die, 98 rpm screw speed). The extruded product was chipped and blended with the fumed silica for about 15 minutes in the twinshell blender. The resulting product was then pulverized on a Bantam hammermill (0.013 inch screen, high speed) and filtered through a 200 mesh sieve.

EXAMPLES 2–7

Thermosetting powder coating compositions in accordance with this invention were prepared by the process of Example 1 or an equivalent process using the components listed in Table 2.

TABLE 2

| EX. NO. | 2 | 3 | 4 | 5 | 6 | 7 |
|---|---|---|---|---|---|---|
| COMPONENT | PARTS BY WEIGHT | | | | | |
| Saturated, carboxy group-containing polyester resin | 60.0[5] | 60.0[5] | 60.0[9] | 70.0[9] | 60.0[11] | 70.0[12] |
| Epoxy resin[6] | 40.0 | 40.0 | 40.0 | 30.0[10] | 40.0 | 20.0 |
| Acrylic resin[7] | 1.5 | 1.5 | 1.5 | 1.5 | 1.5 | 1.5 |
| Benzyltrimethyl-ammonium chloride catalyst | 1.0 | 1.0 | 1.0 | 1.0 | 1.0 | 1.0 |
| Benzoin | 1.0 | 1.0 | 1.0 | 1.0 | 1.0 | 1.0 |
| Polyamide resin[8] | 1.0 | 1.0 | 1.0 | 1.0 | 1.0 | 1.0 |
| Fumed silica | 0.1 | — | — | — | — | — |
| Colorant | — | 0.4 | 0.4 | 0.4 | 0.4 | — |
| Triglycidyl | — | — | — | — | — | 2.3 |

TABLE 2-continued

| EX. NO. | 2 | 3 | 4 | 5 | 6 | 7 |
|---|---|---|---|---|---|---|
| COMPONENT | | | PARTS BY WEIGHT | | | |
| isocyanurate | | | | | | |

[5] Same as in Example 1.
[6] Epon 2002 epoxy resin.
[7] Resiflow P acrylic resin.
[8] Versamid 754 polyamide.
[9] Uralac P2127 No. mol. wt. 2750–3250, functionality 3.75 ± 0.25, acid value 70–80.
[10] D.E.R. 642 epoxy resin.
[11] No. mol. wt. 3250–3750, functionality 2.35 ± 0.10, acid value 30–36.
[12] No. mol. wt. 3250–3750, functionality 2.30 ± 0.10, acid value 30–36.

The powder coating compositions of Examples 1–7, when used to coat magnet wire, form insulative coatings which have reduced air entrapment and improved dielectric strength.

What we claim is:

1. An electrical conductor coated with a cured thermosetting powder coating which, in its uncured state comprises:
   A. a saturated, carboxyl group-containing polyester resin;
   B. an epoxy resin;
   C. an acrylic resin; and
   D. benzoin.

2. A coated electrical conductor in accordance with claim 1 wherein the powder coating further comprises a cure catalyst.

3. A coated electrical conductor according to claim 2 wherein a cure catalyst is benzyltrimethylammonium chloride.

4. A coated electrical conductor in accordance with claim 1 wherein the powder coating further comprises a polyamide resin.

5. A coated electrical conductor in accordance with claim 1 wherein the powder coating comprises about 30 to about 95 parts by weight saturated, carboxyl group-containing polyester resin, about 5 to about 60 parts by weight epoxy resin, about 0.5 to about 5.0 parts by weight acrylic resin, and about 1.0 to about 10.0 parts by weight benzoin.

6. A coated electrical conductor according to claim 2 wherein the cure catalyst is employed in an amount up to about 5.0 parts by weight.

7. A coated electrical conductor according to claim 3 wherein the benzyltrimethylammonium chloride is employed in an amount up to about 5.0 parts by weight.

8. A coated electrical conductor according to claim 1 wherein the benzoin is employed in an amount of from about 1.0 to about 10.0 parts by weight.

9. A coated electrical conductor according to claim 4 wherein the polyamide resin is employed in an amount up to about 10.0 parts by weight.

* * * * *